(12) United States Patent
Baker

(10) Patent No.: US 6,505,046 B1
(45) Date of Patent: Jan. 7, 2003

(54) METHOD AND APPARATUS FOR DISTRIBUTING LOCATION-BASED MESSAGES IN A WIRELESS COMMUNICATION NETWORK

(75) Inventor: Steven F. Baker, Alpharetta, GA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/195,945

(22) Filed: Nov. 19, 1998

Related U.S. Application Data (60) Provisional application No. 60/066,653, filed on Nov. 19, 1997.

(51) Int. Cl.[7] .................................................. H04Q 7/20
(52) U.S. Cl. ........................................ 455/456; 455/466
(58) Field of Search ................................. 455/466, 517, 455/414, 412, 456; 705/14

(56) References Cited

U.S. PATENT DOCUMENTS

| | | | | |
|---|---|---|---|---|
| 5,508,731 A | * | 4/1996 | Kohorn | 455/5.1 |
| 5,604,921 A | * | 2/1997 | Alanara | 455/45 |
| 5,778,304 A | * | 7/1998 | Grube et al. | 455/33.1 |
| 5,952,958 A | * | 9/1999 | Speasl et al. | 342/357 |
| 5,963,861 A | * | 10/1999 | Hanson | 455/456 |
| 6,011,976 A | * | 1/2000 | Michaels et al. | 455/466 |
| 6,041,047 A | * | 3/2000 | Diachina et al. | 370/347 |
| 6,067,529 A | * | 5/2000 | Ray et al. | 455/466 |
| 6,091,956 A | * | 7/2000 | Hollenberg | 455/456 |
| 6,091,961 A | * | 7/2000 | Khalil | 455/466 |
| 6,173,311 B1 | * | 1/2001 | Hassett et al. | 709/202 |
| 6,208,866 B1 | * | 3/2001 | Rouhollahzadeh et al. | 455/456 |

* cited by examiner

Primary Examiner—Nguyen T. Vo (57) ABSTRACT

The process and network processes a mobility origination message, derives the subscriber's location and constructs a set of coupons or advertisements based on that location, for that subscriber, and at that particular time. The coupons or advertisements are then transmitted to the subscriber's handset. A retailer enters the various advertisements or coupons into the network for transmission to subscribers who call a predefined telephone number.

15 Claims, 6 Drawing Sheets

`<retailer name> <text message> <outlet phone #> <distribution date> <message ID>`

FIG. 1

| Retailer Name: | Stan's Crabbin and Fishin Shack - Topeka, KS |
|---|---|
| Text Message: | All you can eat for just $9.99 Mon-Fri. Call for reservations. |
| Outlet Phone #: | On. |
| Distribution Date: | On. |
| Message ID: | On. |

FIG. 2A

For 80 character message:

Stan's Crabbin All you can eat for just $9.99 Mon-Fri. Call for 04/01/97 019287

FIG. 2B

For 191 character message:

Stan's Crabbin and Fishin Shack - Topeka, KS All you can eat for just $9.99 Mon-Fri. Call for reservations. (972) 555-1234. 04/01/97 019287

METHOD AND APPARATUS FOR DISTRIBUTING LOCATION-BASED MESSAGES IN A WIRELESS COMMUNICATION NETWORK

RELATED APPLICATIONS

This application claims the benefit of U.S. Provisional Application No. 60/066,653, filed Nov. 19, 1997.

BACKGROUND OF THE INVENTION

I. Field of the Invention

The present invention relates to radio communications. More particularly, the present invention relates to short messaging service in a wireless radio communication system.

II. Description of the Related Art

Retailers have various methods for advertising to consumers. Television, newspaper advertisements, flyers, and coupons are typically used for advance notice of specials that are available at a store.

If a retailer would like to make a change or addition to the advance notices after the notices have been printed or telecast, these changes must be listed in the store. Otherwise, the retailer must wait until the advance notice is scheduled to be printed or telecast again to disseminate any changes.

Additionally, if the retailer would like to advertise specials throughout the business day, they have to post signs or make announcements over a public address system. These may not reach everyone in the store or in the vicinity of the store if that particular consumer is not paying attention to the verbal announcement or does not see the sign. There is an unforeseen need for a way to advertise to consumers in the vicinity of a retail store or restaurant.

SUMMARY

The system and process of the present invention enables a retail establishment or restaurant to advertise in real-time to local consumers. This is accomplished by transmitting coupons or advertisements to wireless subscribers using a short messaging service provided by various air interfaces (i.e., GSM, CDMA).

The process of the present invention encompasses the delivery of short message service messages to a transceiver located in a wireless network cell area. The process first receives a specified called party number. The called party number prompts a short message service device to transmit messages to the transceiver.

In one embodiment, the process determines the geographic location of the transceiver. This location can then be used to construct a set of messages to be transmitted to the transceiver.

The set of messages is then transmitted to the transceiver. The transceiver user can then determine whether to use or delete the message.

DETAILED DESCRIPTION OF THE PREFERRED EMBODIMENT

The distribution process and network of the present invention distribute retail coupons and advertisements to wireless communication system subscribers. The subscribers can be radiotelephone users, pager users, two-way radio users, or users of other forms of wireless communication.

The process of the present invention manages a database of retailers, coupons, and locations of retail outlets or places for advertisements. These locations include malls, grocers, restaurants, and any other locations that sell goods and/or services.

In a cellular or mobility network of the present invention, the distribution process is triggered when subscribers visit a retail location and dial a pre-defined, advertised number using a radiotelephone. The process derives the subscriber's location from the mobile origination and compares this to the retailer records stored in the database for that location. The process then sends messages with coupons or advertisements to the subscriber for each retailer or advertiser listed for that particular location.

In the preferred embodiment, the process uses a cellular short messaging service to send these messages to the handset from which the predefined number was dialed. The handset then stores the short messages to be recalled later. Once recalled, the messages are displayed on the handset when the subscriber visits the retail location.

In the preferred embodiment, access to the features supported by this process is provided through a standard internet or intranet connection. All menus in this process are web-based HTML menus as are well known in the art. These menus can be easily viewed through any standard internet Web browser such as NETSCAPE OR INTERNET EXPLORER. HTML is a standardized "mark-up" language that is used to define the look and feel of a web page accessible from the World Wide Web (WWW).

These menus are broken down into three basic categories. The categories are retailer management, coupon management, and message distribution process administration. In the preferred embodiment, the wireless operator makes the retailer management and coupon management menu options accessible from their corporate Internet site while limiting access to the message distribution process administration to the corporate Intranet.

The retail management system provides unsecured, WEB-based access to the retailer database. This is done for initial sign-up to the service. When the retailer signs-on, they must select a password that is required to make changes after the initial sign-up procedure.

The retail management system has five primary features. The first, retailer sign-up menu, enables the retailer to sign-up for the service automatically. This is accomplished by entering specific information such as retailer name, location, and billing information on the sign-up WEB page. For customers representing larger, distributed retail chains, individual store information can be entered manually or imported directly from the WEB page via a specially formatted text file.

Another retail management system feature is automated billing. The billing information for the retailer is captured during the sign-up phase and supports debiting from any major credit card. The system provides validation of credit and automatically bills based on usage. Other forms of payment, in alternate embodiments, are also possible. The operator, through the administration management menu described later, configures billing usage parameters.

The automatic cell/sector-mapping feature of the retail management system uses the street address of the individual store or outlet to determine which sector or cell to use for the store. The system automatically tags individual stores or locations in the database, with the correct cell/sector identifications that are well known in the art.

The multiple-locator specification feature is based on a standard mobility or cellular network infrastructure that already supports short messaging. Short messaging is defined as the ability to send a short text message or page to a radiotelephone. In the preferred embodiment, the current service cell site or cell sector is used to identify the location of the radiotelephone. Alternate embodiments use triangulation, global positioning satellites or other location determining mechanisms.

Password maintenance is another of the retail management systems features. This process maintains a database of passwords for the appropriate retailers. In the preferred embodiment, the password is required to be changed after a predetermined interval of time.

The coupon management system of the present invention provides a secure, WEB-based access to the coupon database for entry, validation, and manipulation of individual coupons or advertisements. The coupon management system supports multiple features.

One feature of the coupon management system is coupon entry and modification. This feature enables the retailer to enter coupons or advertisements as well as distribute parameters concerning each one. These distribution parameters include single vs. recurring distribution (i.e., daily, weekly, monthly, yearly), start and end dates, start and end times, maximum number of coupons per distribution period, the total number of maximum coupons, and the list of retail outlets to receive the coupon from the list that was entered at sign-up.

Another coupon management feature is coupon validation. This feature appends a unique identification number to each coupon as they are distributed to subscribers. This ensures that the subscribers do not copy and send the coupons to themselves. The value of the coupons is pre-defined up to the total number of coupons allowed for that distribution and can be viewed through the WEB-based menus.

To redeem the coupon, the subscriber simply shows the short message to the cashier or attendant when checking out. To avoid duplicate redemption of coupons, the retail outlet can keep track of the coupons redeemed.

The message distribution process administration system provides secure, WEB-based access to the message distribution process administration. These menus are intended to be accessed from the administrator's corporate intranet and are password protected. The basic features supported in this system include: process configuration, system parameters, global distribution and billing parameters, individual retailer control and billing, and system maintenance.

The subscriber has several user interfaces including the requirement of dialing the pre-defined telephone number to access the service. The subsequent discussion assumes that the only device used by the subscriber is a mobile radio-telephone that operates in a cellular type environment. This radiotelephone supports both voice-based telephone calls as well as text short messaging. Also in the preferred embodiment, the radiotelephone can store multiple short messages for subsequent recall and viewing.

As described above, alternate embodiments use other forms of wireless communication. These can include pagers, computers with wireless modem capability, two-way radios, and any other form of wireless communication that accepts and displays short text messaging.

In another alternate embodiment, the wireless communication device has the ability to convert text to speech. In this embodiment, a display is not necessary and the coupon or advertisement can be announced aurally.

Short messages generated by the present invention have a pre-set number of fields that can be turned on and off by the wireless operator on a per retailer basis. In the preferred embodiment, the short messages can vary from as little as 80 characters up to 191 characters. Alternate embodiment can have more or less characters depending on the air interface used.

In the preferred embodiment, the air interface protocol is code division multiple access (CDMA). However, any air interface that permits short messaging can be used. These include GSM and TDMA.

Figure 1:
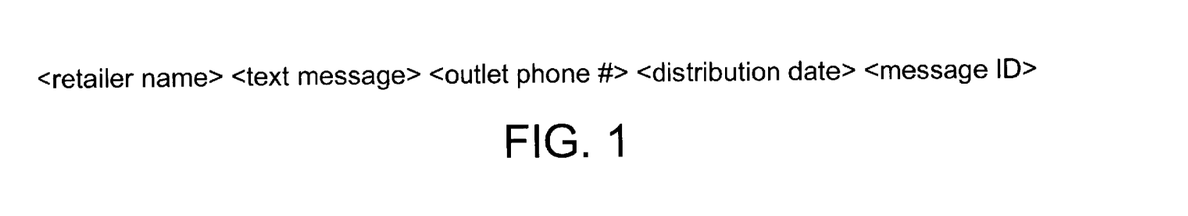
FIG. 1 shows a message format.

The actual message entered on the WEB page has the format illustrated in FIG. 1. This format includes the retailer name, text message, outlet telephone number, distribution date, and message identification.

The retailer name field is taken from the retail outlet record for the retailer for whom the message is sent. For example, a retailer may define outlets in the southern U.S. that are called "Gulf State Clothing" while those in the north are called "Yankee Clothing Review". If they send the same coupon to all locations, the proper name for the message is taken from the outlet record matching that particular location.

The text message field is a free form text message that may be entered by the retailer. This might include a coupon statement or sales advertisement. For example: "15% off all women's shoes" or "free perfume for the first 100 customers".

The outlet telephone number field is from the retail outlet record and can be turned off and on by the retailer. This field is intended to enable the subscriber to dial that store on the spot. In a two-way messaging system, the message can include an optional reply such as "1. Speak to the retailer". Selecting this option would automatically connect the subscriber with that retail outlet in a voice call. This call is set-up by a wireless services node (WSN) after the reply is received from the radiotelephone.

The distribution data field is the date the message is successfully sent to the short message service center to be forwarded to the subscriber. This date should match the date for which the subscriber receives the message. This field, combined with the message identification, uniquely identifies any message distributed by the message distribution process. This field has the form mm/dd/yyyy and can be turned off and on by the retailer on a per coupon basis.

The message identification field is a five-character field that uniquely identifies a particular message sent to a subscriber on a specific day. In other words, each time a particular message is sent out to a specific subscriber it will have a unique identification appended to it. Given a limit of five characters, the maximum number of messages that can be sent out for a particular retail outlet is 99,999. This value is entered automatically by the message distribution process and can be turned on and of by the retailer. It is used for individual coupon validation and fraud control.

The retailer may enter the message twice. The first time it is entered for a smaller default message with an 80-character limit and a second time for a larger message with a 191-character limit. Alternate embodiments use other lengths of messages.

The retailer must also enter a default message size. The reason for this is that the message size supported in the network and by the handset maker may vary. This information may not be available to the message distribution process.

The message distribution process attempts to determine the size of the message supported by the network and subscriber's radiotelephone and will always send the largest message entered by the retailer. If the message distribution process cannot determine the size of the message supported by the network, a default message size is used to determine which message to send. The 80-character limit is currently a size that most networks and radiotelephones support in today's networks. The character limits vary depending on the type of network, type of communication device, and air interface.

Once the retailer enters a message, it is re-displayed on the menu as it will be sent to he subscribers. This allows the retailer to see the resulting message and any data truncation that was necessary to fit the message to the allowable message size. The retailer can then make any changes to ensure the entire message is accurate.

The message distribution process of the present invention automatically truncates blank spaces on the end of a field and concatenates the fields together to make the message. When a message is entered that does not fit into the size allowed, the message distribution process removes or truncates fields using predetermined precedence until the message fits.

The message distribution process first removes the outlet telephone number, if this field is turned on, to try to fit the message into the allowed character limit. If the message still does not fit, the retailer name is truncated from the right by up to 15 characters. If this still does not allow a fit, the text message is truncated from the right until the size limitation is reached. The date and message identification are not truncated if they are turned on.

Figure 2A:
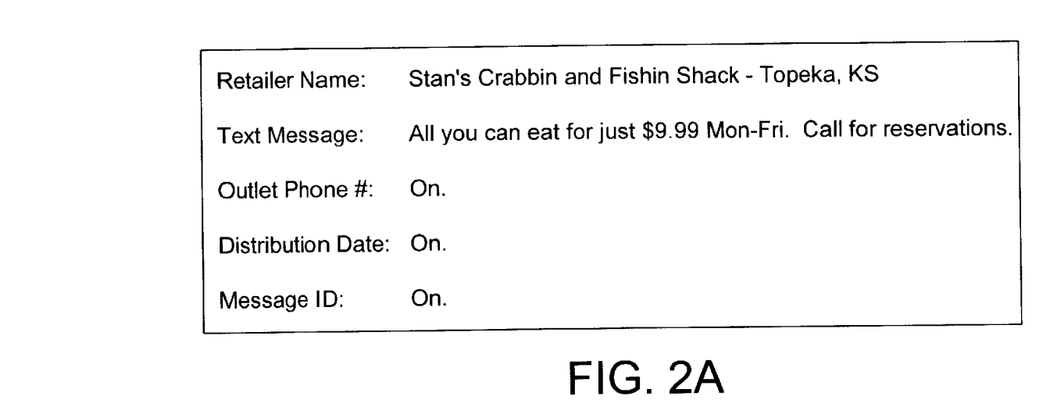
FIGS. 2A–2C show an example of the results of a truncation process of the present invention.
Figure 2B:
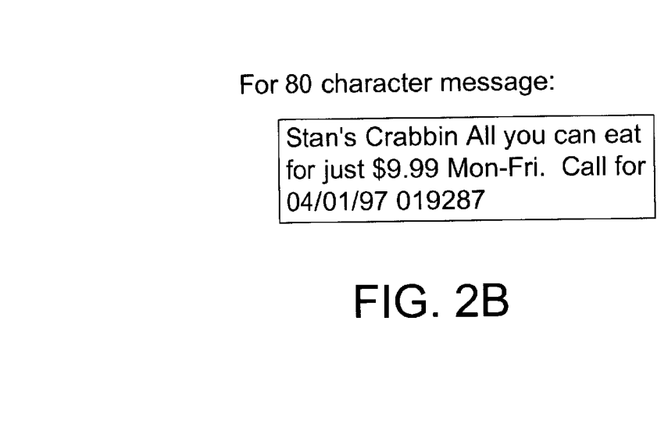
Figure 2C:
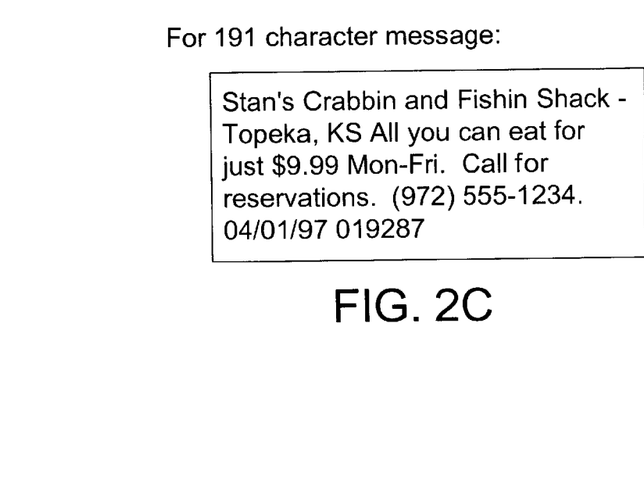

An example of the truncation process is illustrated in FIGS. 2A–2C. FIG. 2A shows an example of a retailer who has entered a special advertisement for general broadcast. In this embodiment, all the fields are turned on and a text message is entered.

In the 80-character version, illustrated in FIG. 2B, the truncation rules remove the telephone number, portions of the retailer name, and part of the text field. The 191-character version, illustrated in FIG. 2C, leaves the entire message intact. Since this message is more an advertisement than a specific coupon for a specific subscriber, the retailer could probably remove the message identification and date to gain more characters for the other fields.

Figure 3:
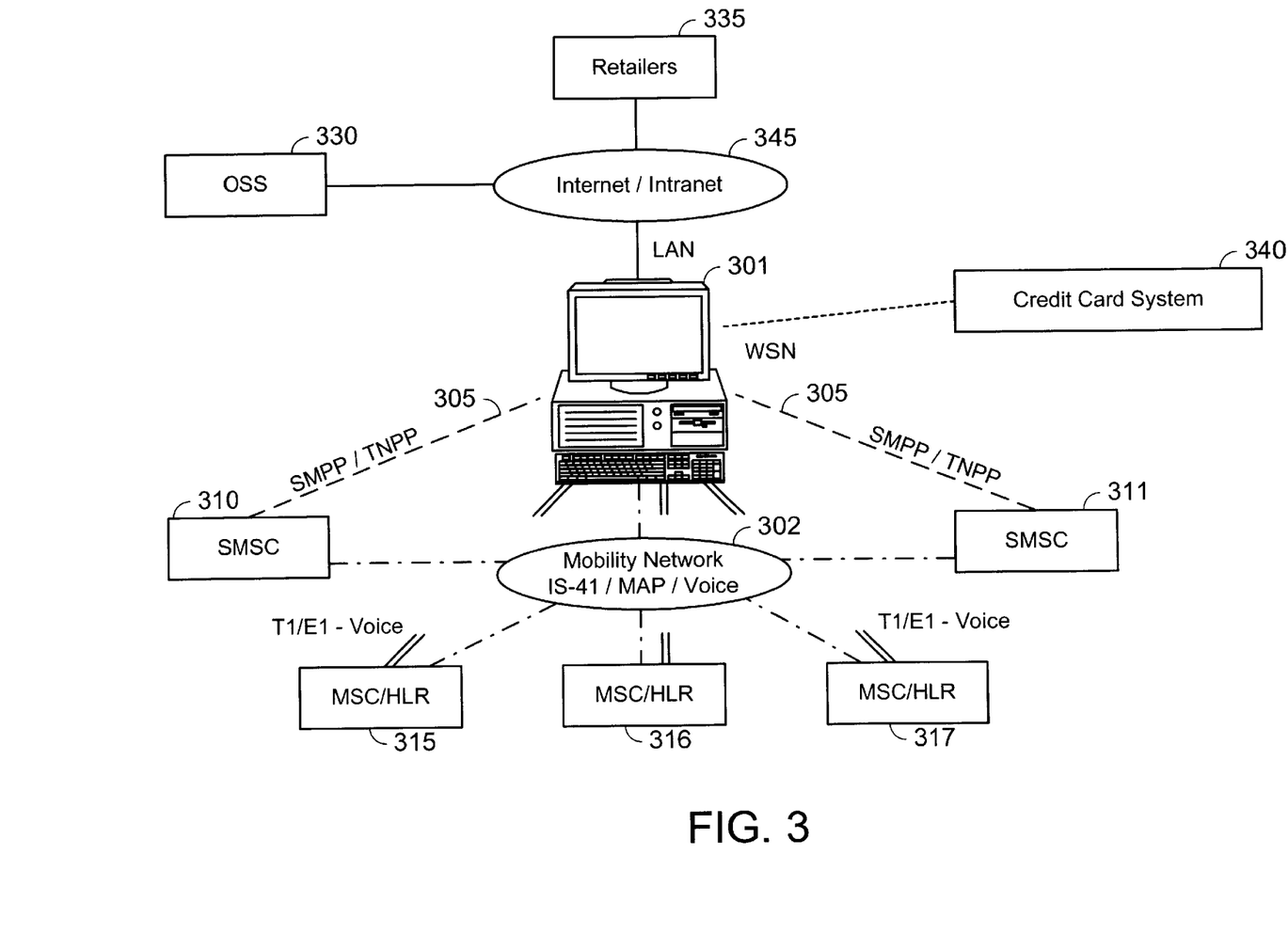
FIG. 3 shows a block diagram of the network architecture.

FIG. 3 illustrates the architecture of the network of the present invention. The message distribution process of the present invention, in the preferred embodiment, is performed by a desktop computer (301) running an AIX operating system. The desktop computer (301) is subsequently referred to as a wireless services node (WSN). Alternate embodiments use other types of computers running other operating systems.

The WSN (301) is an integrated computer telephony platform that supports wireless mobility applications. It supports interfaces to a number of mobility related network components for the purpose of providing enhanced mobility services. The WSN supports a number of interfaces.

One interface supported by the WSN is the mobility interface (302). This interface (302) is between the WSN (301) and a mobile switching center or home location register (315–317) that supports mobility triggers such as call originations, terminations, and roaming primitives. The component of this interface that affects the message distribution process of the present invention includes the origination trigger and the ability for this interface (302) to support location of the subscriber while roaming. Specifically, this interface (302) initially supports the current mobility interfaces IS-41 and GSM over an SS7-based carrier.

The short message center interface (305) enables the WSN (301) to communicate with a short message center (310 or 311). The short message center (310 or 311) performs store and forward functions on the message and performs the actual function of delivering the message through the mobility network (302). This interface can include messages to short messages service centers, paging systems, or other two-way radio communication devices. This process supports two open interfaces: short messaging point-to-point, and TNPP 0.

The WSN (301) also supports a voice interface to individual MSCs (315–317) for the purpose of playing specific announcements to subscribers when they originate a call from a predefined number. This interface may route through the public switched telephone network and supports these interfaces over T1 or E1 carrier standards. These interfaces can be in-band signaling, based on DTMF/MFCR2, or out-of-band signaling such as SS7 ISUP. Both types of signaling are well known in the art.

The credit card interface enables the WSN to communicate with a central credit card verification database (340). The WSN uses this interface to transmit credit card numbers over in order to secure payment for services. The format and type of signaling are well known in the art and are not discussed further.

The Internet/Intranet interface (345) is a simple TCP/IP-based connection that offers access to WEB pages that are defined for this message distribution process from a LAN connection. This server is intended to sit on a network that already provides remote modem access from the Internet.

The mobility switching center (MSC) (315–317) and home location register (HLR) (315–317) combine to provide basic cellular and roaming service to wireless subscribers. The MSC (315–317) is a telephony-switching platform that manages a number of distributed cell sites communicating with wireless subscribers through radio systems. The HLR (315–317) is a high-end computer system that ties together a number of MSCs to manage the location and routing of calls to subscribers through a network of various MSCs.

The short message service center (310–311) is a specialized computer system that accepts short message requests from various network entities. The message requests are stored and forwarded to various subscribers when they become available in the network (i.e., they turn their phone on).

The operations support system (330) is another specialized computer system. Cellular providers to monitor and manage their network of mobility components use the operations support system (330). The retailer block (335) represents Internet access by retailers using PC-based Internet browsers.

Figure 4:
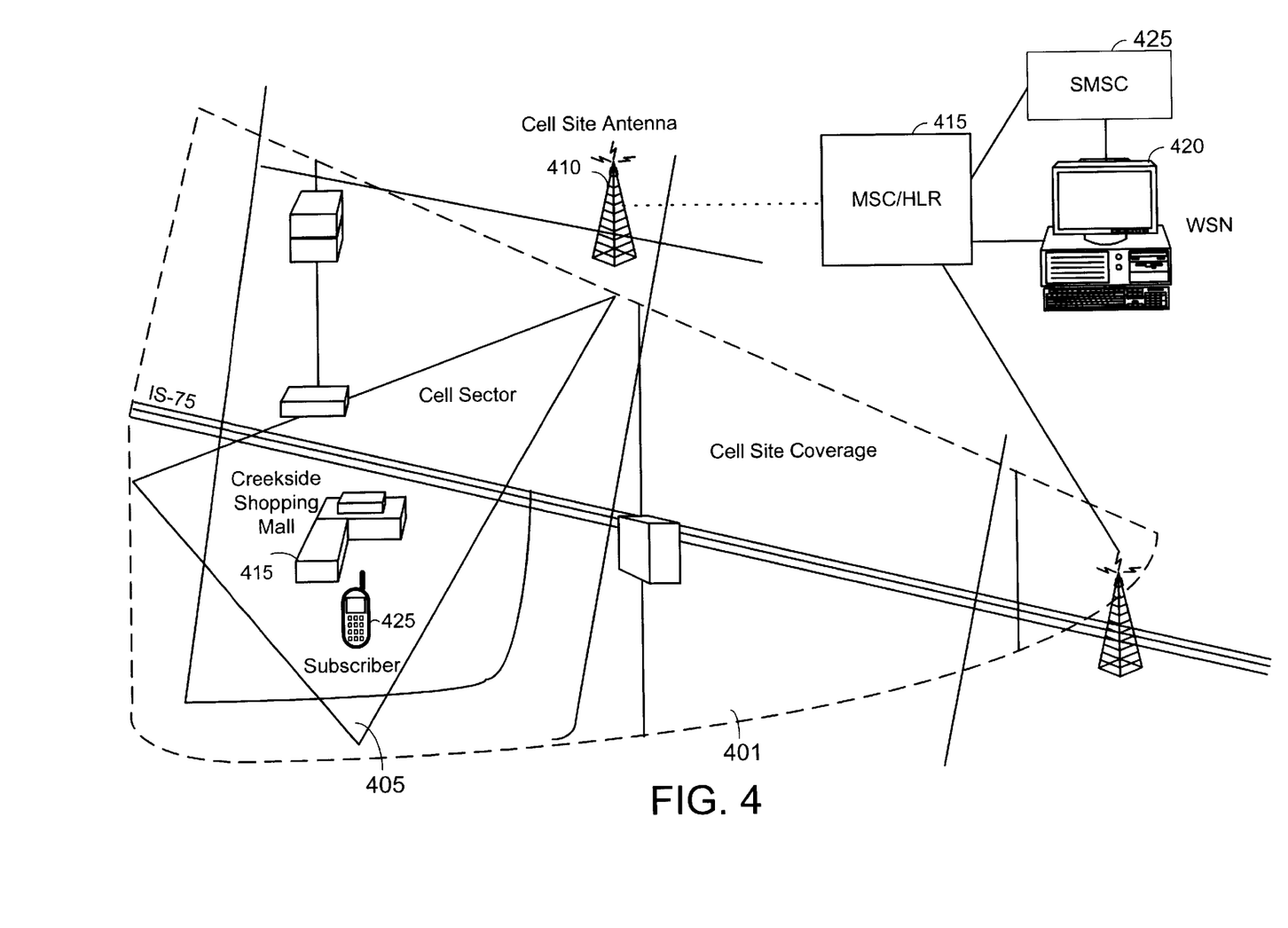
FIG. 4 shows an example of the operation of the present invention in a mobility environment.

FIG. 4 illustrates an example of how the message distribution process of the present invention works in a cellular mobility environment. The figure shows one half of a cell coverage area (401) with a single cell sector (405) highlighted as a triangle emanating from the cell site antenna (410).

An MSC/HLR (415) manages a number of cell sites, each possibly having multiple cell sectors. As retailers sign up for this service, through the WSN (420) and short message service center (425), they are mapped to a particular cell or cell sector such as the "Creekside Shopping Mall" (415).

When the subscriber (425) roams to that sector and originates a call, the MSC/HLR (415) passes an origination notification to the WSN (420) that contains both the identity of the subscriber (425) and the identification of the particular cell/sector in which the subscriber (425) is located. The message distribution process of the present invention uses this information to determine which coupons are relevant for retailers in that location. The coupons are then sent to the subscriber through the service MSC.

In the preferred embodiment, the message distribution process of the present invention relies on mobility origination notification to know when the subscriber is located in that cell sector and when they desire the coupons. Any network can be supported that can provide specific location of a subscriber within a one to two mile radius all the way down to a 100 foot radius.

The present invention uses the same device for locating, communicating with, and distributing coupon messages to the subscriber. In the preferred embodiment, this device is the radiotelephone handset. The message distribution process can operate down to a granularity of a global positioning satellite system (GPS) if a subscriber had all three capabilities in a particular device. For example, the process also functions if the subscriber had a GPS unit that transmitted its location, a phone to communicate with the subscriber, and a pager to receive the coupon message.

As described above, the preferred embodiment of the present invention is in a cellular network where location is currently defined through cells and cell sectors. In this environment, each cell site is broken into several cell sectors as defined by the mobility switch configuration. The present message distribution process extends well beyond coupons and can be used for general location-based messaging such as free offers at sports event in a stadium, advertising for restaurants, or corporate environments for employee-based message broadcasting. The present invention also distinguishes between corporate or private cells and the standard residential macro network using additional information in the origination request.

Figure 5:
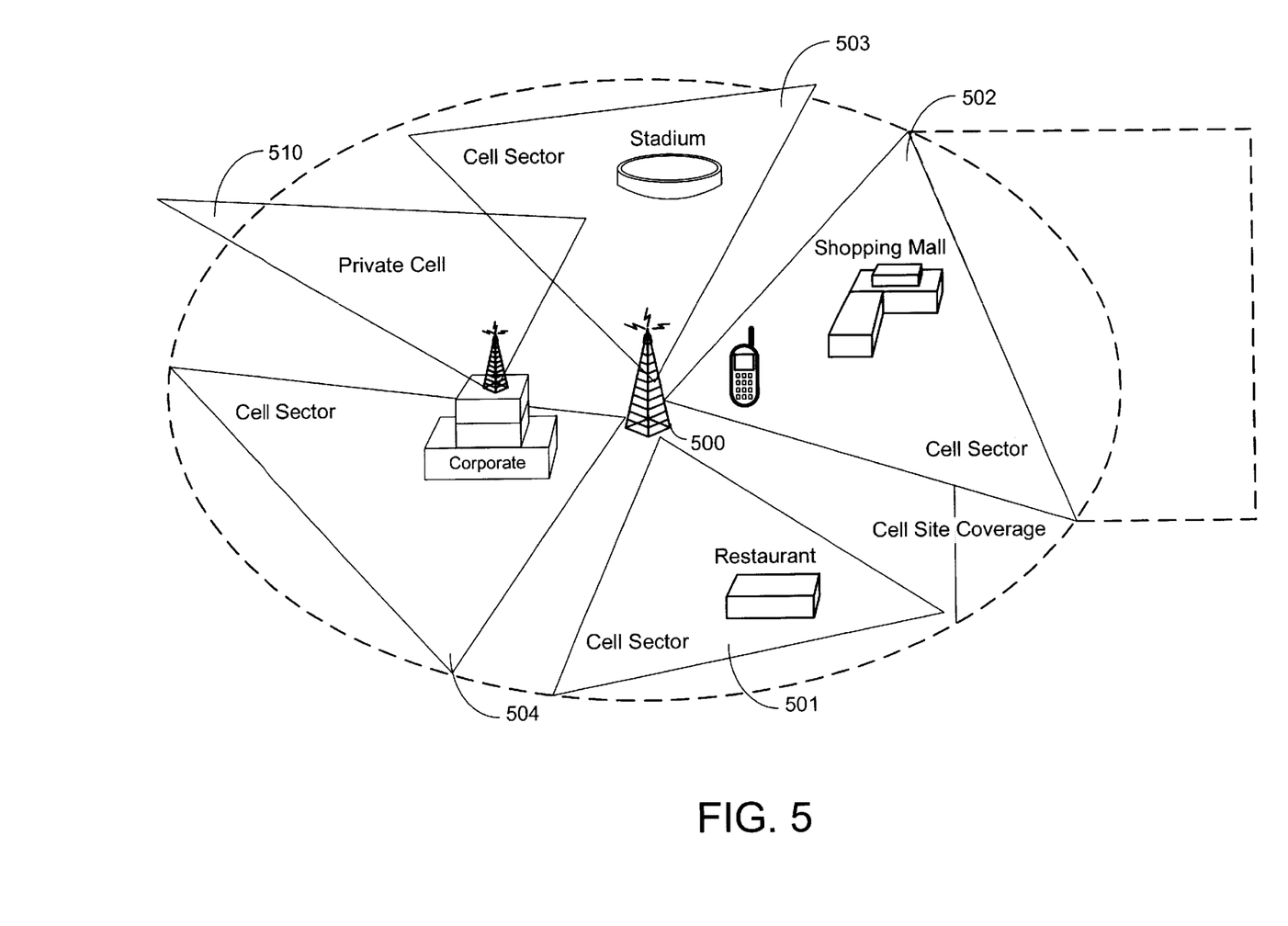
FIG. 5 shows an example of a full cell site with four sectors and one private cell in accordance with the present invention.

FIG. 5 illustrates an example of a full cell site (500) with four sectors (501–504) and one private cell (510) atop a corporate building. The sectors overlap somewhat within a cell to some retail outlets may appear in more than one sector or cell. Likewise, if a finer grained location technology other than cells or cell sectors is used, such as GPS, location data in the present invention's database will have a range of location-based information for each outlet. In this case, the range would be defined to fit the individual outlet or structure including parking for example.

The database of the present invention additionally contains subscriber profiles that further filter the types of coupons or advertisements generated. The database, in the preferred embodiment, includes specific categories pertinent to a particular subscriber such as sporting goods, jewelry, or clothing. The message search filter criteria combines the subscriber's location, retailer's location, and the subscriber's profile. Alternate embodiments may search on just the subscriber's category if location is not included.

Figure 6:
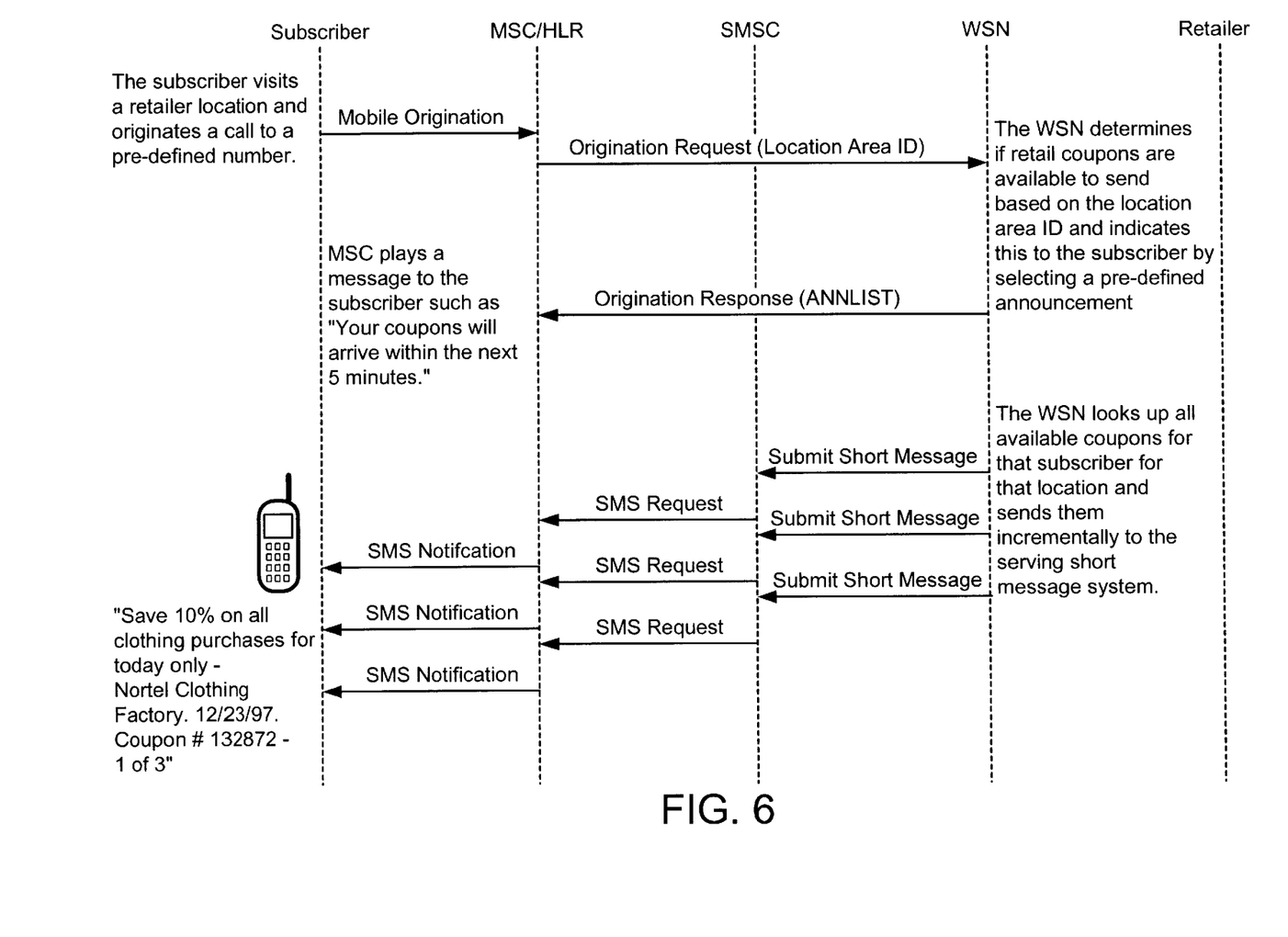
FIG. 6 shows a network message flow diagram in accordance with the present invention.

FIG. 6 illustrates a network message flow between various components of the network of FIG. 3. This message flow assumes an IS-41C mobility network using an SMPP-type short message center interface. It additionally assumes that one or more retailers at a particular location have subscribed to the service and entered a series of coupons for this particular location.

Once the subscriber is in the general vicinity of the retail location, such as inside the mall commons or retail outlet, they can dial the predefined network telephone number. The MSC/HLR component is configured to send an origination request to the wireless service node (WSN) when any subscriber dials this number.

The origination request includes, among other possible parameters, the mobile identification number that uniquely identifies the mobile, the identification of the serving MSC or visitor location register, and as an optional parameter, the location area identification.

The location area identification includes the cell and cell sector identification from where the call is made. Note that this is an optional parameter and may not be supported on all MSC/HLR components.

When the WSN receives this message, it performs validation on the message. If the location is not valid, such as an interstate highway away from retailers, the message is rejected.

In each case, the WSN returns an origination request response to the MSC/HLR with an announcement list indicating a predefined, relevant announcement to play for the subscriber. For instance, if there are no coupons, then a message might be played "We would like to thank-you for using this service today. However, there are currently no coupons available at this location."

Once the origination is processed, the WSN collates all coupons for the location and begins sending them to the short message service center. From there, the short message service center downloads them to the subscriber through the appropriate MSC/HLR components.

Figure 7:
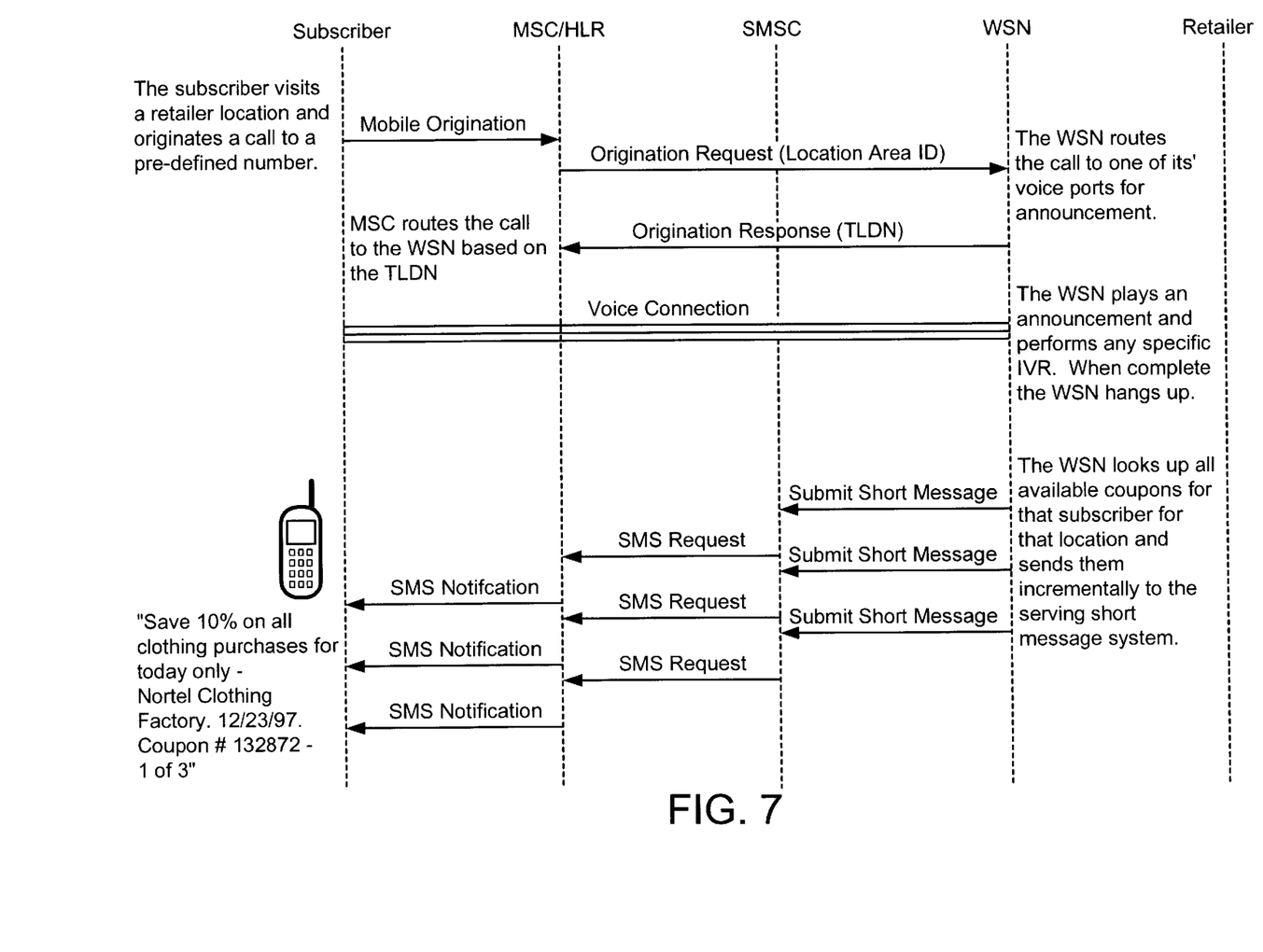
FIG. 7 shows an alternate embodiment of a network message flow diagram.

FIG. 7 illustrates an alternate embodiment message flow. This message flow includes WSN announcements to indicate to the user the number of coupons to be downloaded. Additionally, the announcement includes the list of coupons from which the caller can select or a branding announcement with the name of the retail location.

The MSC/HLR generates the origination request, with the optional location area identification, and sends it to the WSN. The WSN then routes the call to one of its voice ports for the announcements.

The message flow begins with the subscriber dialing the pre-defined telephone number. The mobile then generates the origination message to the MSC/HLR. The message flow requires that the original voice call be routed back to the WSN as part of the origination request. In this case, the mobile origination response includes a temporary logical dialed number that causes the MSC to route the call to the WSN.

When the call arrives, a voice connection between the WSN and the subscriber handset is set-up. At this point, the WSN plays a specific announcement such as "Welcome to Dirty Creek Mall. We will shortly download 3 coupons to your handset."

The WSN can also be configured to further filter the information sent to the handset by giving the subscriber selectable options through an interactive voice response menu. The user can respond to requests by pressing a particular key or speaking a particular word or words. After the announcement or interactive voice response is complete, the WSN disconnects the voice connection and begins sending the short message coupons incrementally.

In summary, the network and process of the present invention provides the ability to process a mobility origination, derive the subscriber's location from this trigger, and construct the set of all coupons or message associated with that location, for that subscriber, at that time. These messages are then delivered to the subscriber on their handset for their selection or deletion.

I claim:

1. A method for delivering short message service messages to a transceiver located in a wireless network cell area, the method comprising the steps of:

establishing an SMS advertisement message activation phone number;

receiving a call at the SMS message activation number, the call including a specified calling party number prompting a short message service device to transmit messages to the transceiver identified by the specified calling party number;

mapping a list of vendors to a geographically identified location to define a specified retail location;

determining the retail location that corresponds to the location of the transceiver;

constructing a set of messages for the list of vendors at the retail location for transmission to the transceiver according to retail locations that correspond to the location of the transceiver; and transmitting the set of messages to the transceiver.

2. The method of claim 1 wherein the retail location comprises a specific coordinate within a specified accuracy.

3. The method of claim 1 wherein the set of messages includes coupon information.

4. The method of claim 1 wherein the set of messages includes advertisements.

5. The method of claim 1 and further including the step of creating a database comprising subscriber profiles.

6. The method of claim 5 wherein the step of constructing a set of messages further depends on the database of subscriber profiles.

7. A network for distributing location-based messages in a wireless communication system, the network comprising:

a wireless services node that supports a plurality of wireless mobility processes wherein the wireless services node is formed to correlate vendors to specific geographic locations to define a retail location and to create a list of advertisement messages for delivery to a mobile station through SMS messages according to the mobile station's geographic location;

a mobility switching center, coupled to the wireless services node, for routing wireless communication traffic; and a short message service center formed to automatically generate short message service messages to a calling party in response to receiving a call on a specified phone number from the calling party, the short message service center being coupled to the wireless services node, wherein the short message service center forwards at least one of a plurality of messages based upon the location of a wireless transceiver requesting a message.

8. The network of claim 7 wherein the mobility switching center is coupled to the wireless services node through a mobility network.

9. The network of claim 8 wherein the mobility network supports short messaging services.

10. The network of claim 8 wherein the mobility network supports voice communication.

11. The network of claim 7 and further including a credit card validation system, coupled to the wireless services node, for verifying credit card status.

12. The network of claim 7 wherein the wireless services node is further coupled to a local area network.

13. The network of claim 12 wherein the wireless services node is coupled to an Internet network through the local area network.

14. The network of claim 7 and further including a database, coupled to the wireless services node, comprising subscriber profiles.

15. The network of claim 14 wherein the database further comprises retailer profiles.

* * * * *